United States Patent [19]

Fell et al.

[11] 4,036,051
[45] July 19, 1977

[54] HEAT METERS

[76] Inventors: Roger Fell, 5 Egremont Road, Milnrow, Lancaster; Brian Clifton, 39 Beech House, The Beeches Manchester, Lancaster, both of England

[21] Appl. No.: 619,182

[22] Filed: Oct. 3, 1975

[30] Foreign Application Priority Data

Oct. 8, 1974 United Kingdom .............. 43553/74

[51] Int. Cl.² ........................................... G01K 17/10
[52] U.S. Cl. .............................................. 73/193 R
[58] Field of Search ............................................ 73/193

[56] References Cited

U.S. PATENT DOCUMENTS

| | | | |
|---|---|---|---|
| 2,329,813 | 9/1943 | Amsler | 73/193 |
| 2,633,749 | 4/1953 | Lindstrom | 73/193 |
| 2,729,976 | 1/1956 | Laub | 73/204 |
| 2,931,222 | 4/1960 | Noldge | 73/193 |
| 3,167,957 | 2/1965 | Ziviani | 73/193 |

FOREIGN PATENT DOCUMENTS 991,006  5/1965  United Kingdom .................. 73/190

*Primary Examiner*—Herbert Goldstein
*Attorney, Agent, or Firm*—Norris & Bateman

[57] ABSTRACT

A heat meter for measuring the rate of flow or quantity of flow of heat gained or lost by a flowing and confined heat transporting medium between two monitoring points comprises inlet and outlet conduits for the passage of heat transporting medium, one conduit having mounted therein a temperature sensitive unit for monitoring the temperature of the flowing medium and therebeing associated with an insulated section of the other conduit a heat transfer unit to heat the medium passing therethrough and a temperature sensitive device for monitoring the temperature of a region of the heat transfer unit which, in use, is in thermal contact with the heat transporting medium, and a controller arranged so that the difference between the two monitored temperatures is minimized.

1 Claim, 3 Drawing Figures

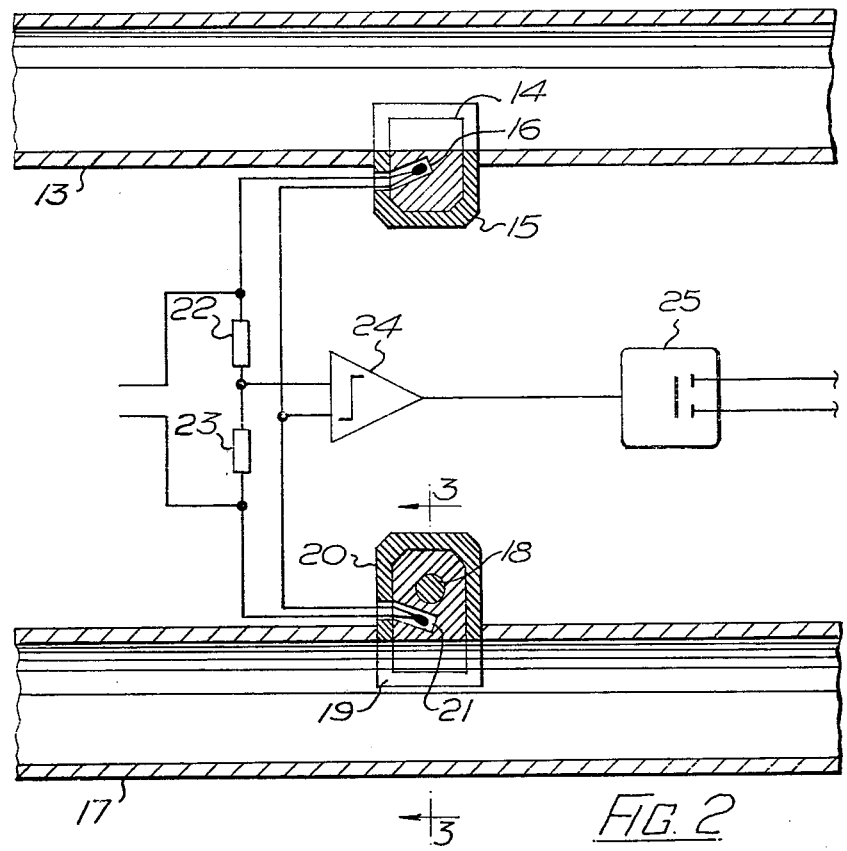
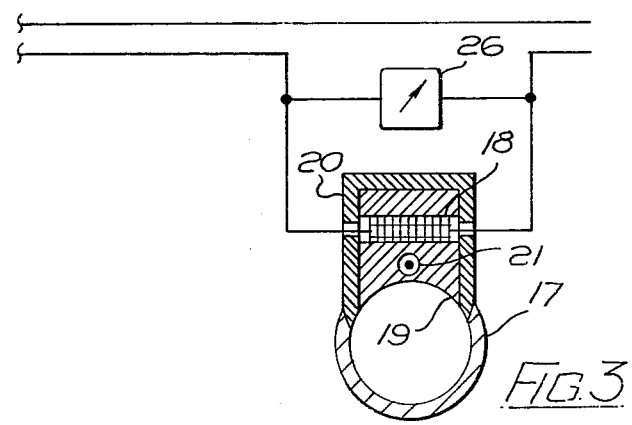

HEAT METERS

This invention relates to improvements in heat metering apparatus and is concerned with devices for measuring or controlling the quantity of heat which is transferred when a liquid (e.g. water) or other heat transporting medium flows through a heat exchanger (e.g. a domestic radiator or air conditioning system) and either loses or gains heat.

Heat meters as heretofore known are based upon means which will indicate the product of the mass flow rate, the mean specific heat and the temperature change of the flowing medium; or the time integral of this quantity. Three principal types have been proposed:

a. MECHANICAL

In this case the heat-energy reading is produced by mechanically biassing the output drive from a flow meter by means of temperature sensitive elements.

b. ELECTRICAL

Here, both flow rate and temperature differences are measured electrically, the heat-energy reading being provided in an electronic or electromechanical device.

c. SHUNT

In this case a known proportion of the return flow is re-heated to the temperature of the inlet flow, the heating power being recorded to provide an inferential measure of the heatflow in the main circuit.

The devices so far described suffer from a number of shortcomings. They may be large, relatively expensive, and can be subject to error if not regularly maintained. The mechanical means, described in (a), when inserted into the flowing medium in order to measure the flow rate, affects the free flow thereof and increases the pressure drop across the meter. Also, great care must be taken in the construction of these devices to avoid leakage. Furthermore, the use of paddle-wheels or rotating vanes immersed in the medium to measure flow prevents the meter being used in applications where the medium might be contaminated with extraneous materials. Pressure drop type flow meters have a limited range and required special de-squaring devices for conversion of the square root scale characteristic of such meters into a linear characteristic. Similarly, the shunt type heat meters described in (c), which require the tapping of a fraction of the flow, must be linearised by some means to allow for the manner in which the flow is diverted through the by-pass.

An object of the invention is to measure the heat lost or gained in a heat exchanger which may take the form of a single device or a system of inter-connected devices in which the measured quantity is the total heat energy either lost or gained by the flowing medium between the monitoring points.

According to the invention a heat metering apparatus for measuring the rate of flow or quantity of flow of heat gained or lost by a confined heat transporting medium flowing between two monitoring points comprises inlet and outlet conduits for the passage of the heat transporting medium, one conduit having mounted thereon a temperature sensitive unit for monitoring the temperature of the flowing medium, there being associated with a section of the other conduit a heat transfer unit for the cooling or heating of the medium passing therethrough, the meter further incorporating a temperature sensitive device which monitors the temperature of a region of the heat transfer unit, which is in thermal contact with the heat transporting medium, in use, the heat transfer unit being thermally insulated from other parts of the conduit, and a means for indicating and controlling the heat energy added to or removed from the heat transfer unit to minimize the difference between the two monitored temperatures.

The invention will be described with reference to the accompanying drawings:

FIG. 2 is a similar view of further arrangement.

FIG. 3 is a section on line 3—3 of FIG. 2.

Figure 1:
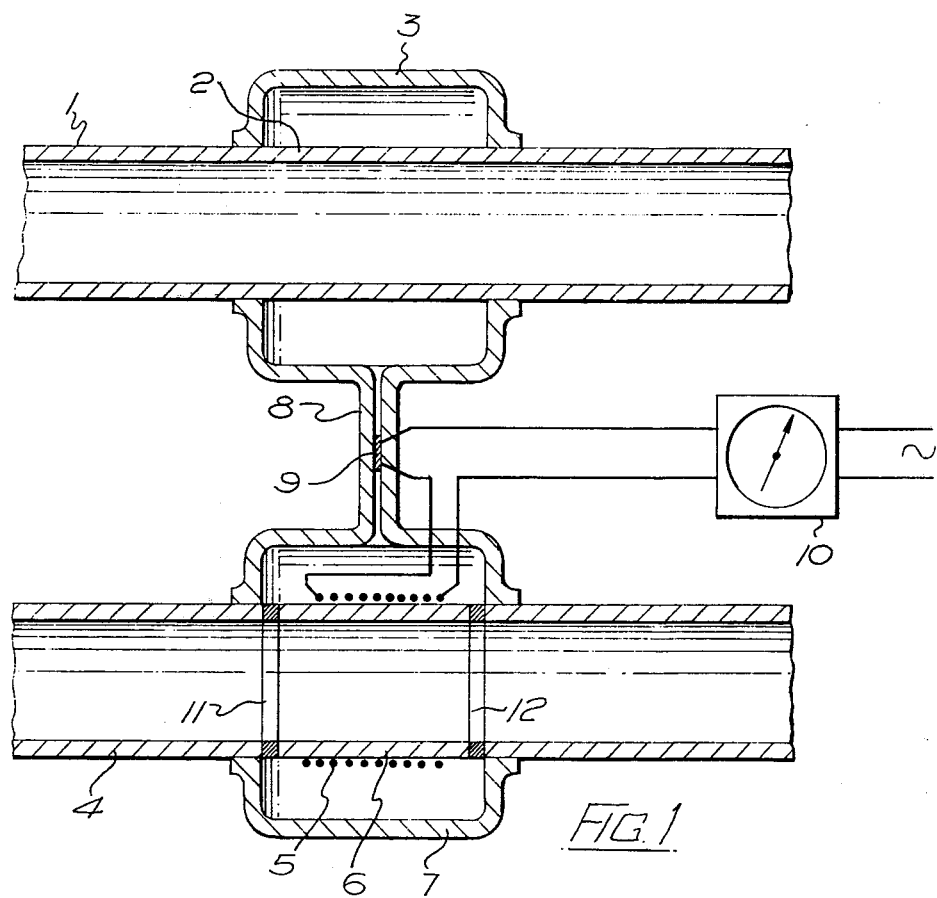
FIG. 1 is a vertical section of apparatus for measuring the heat lost by a heat transporting medium.

In the arrangement shown in FIG. 1 an inlet manifold 1 includes a thermally conductive section 2 through which the temperature of the confined heat transporting medium is sensed by gas enclosed in a bulb 3. An electric heating coil 5 is associated with an outlet manifold 4 in which the electrical energy converted into heat within the coil is dissipated through a thermally conductive section 6 which is thermally isolated from the remainder of the manifold by heat insulating spacers 11 and 12, the temperature of the thermally conductive section 6 being sensed by gas contained in a bulb 7 enclosing the section.

The temperature sensitive gas-filled bulbs 3 and 7, are connected by a capillary tube 8 which incorporates a memory switch 9 to form a differential gas thermometer adapted to indicate the sign of the temperature difference sensed by the bulbs 3 and 7 by the state of the said switch. In operation, the heating coil 5 is connected to a source of electric current via the switch 9 in such a manner that the combined action of the heating coil, the switch, and the differential gas thermometer, is to minimize the difference between the two temperatures monitored by gas filled bulbs 3 and 7, the required heat energy measurement being inferred from the electrical power input indicated by a watt-hour meter 10.

In the arrangement shown in FIG. 2 adapted to measure the quantity of heat lost by a heat transporting medium the inlet conduit 13 contains a thermally conductive section 14 which is enclosed in a thermally insulated housing 15 so that the temperature monitored by a thermister 16 is that of the heat transporting medium confined within the manifold. Associated with the outlet conduit 17 is an electric heater 18 arranged so that the electrical energy converted to heat within the heater is dissipated into a thermally conductive conduit section 19 which is enclosed in a thermally insulated housing 20, the temperature of that part of the said thermally conductive section which is in thermal contact with the confined heat transporting medium being monitored by a thermistor 21. Resistors 22 and 23 are connected to a DC supply and also to the thermistors 16 and 21 to form a bridge circuit so that the output of the comparator 24 which controls a switch 25 is dependent on the sign of the temperature difference monitored by the thermistors. In operation, the heater 18 is connected to a source of electric power by the switch 25 so that the combined action of the thermistor bridge, comparator, switch and heater is to minimize the difference between the two temperatures monitored by the thermistors. The required heat reading is indicated by the timer 26 which is arranged so that it records the total time that the heater is connected to the electrical supply, the heater resistance being constant and the electrical supply being at a constant voltage.

The principle of operation is that of a thermal balance. The electrical energy supplied to the heater is converted into thermal energy and dissipated into the heat transporting medium through the thermally conductive section of the outlet manifold. The rate of heat flow (dq/dt) is given by:

$$dq/dt = \lambda \cdot A \cdot \Delta T \qquad (1)$$

where $\lambda$ is the thermal conductivity of the conductive path, $\Delta$ is the effective area of the conductive path, and $\Delta T$ represents the total of the temperature differences across all barriers to the flow of heat through the thermally conductive section into the core of the flowing fluid and is maintained equal to the temperature change of the heat transporting medium between inlet and outlet conduits by the action of the differential thermometer, switch and heating coil. In an apparatus of the type shown in the drawings the conduit walls are thin and have a high thermal conductivity so that all temperature gradients, except that across the boundary-layer of the heat transporting medium, are small. Thus, the rate of heat flow from the heating coil to the heat transporting medium is given by:

$$dq/dt \simeq K \cdot A \cdot \Delta T \qquad (2)$$

wherein $h$ is the boundary-layer heat transfer coefficient of the heat transporting medium. Now, while the heat transporting medium is in turbulent flow, (i.e. Reynolds' Number > 2100), the boundary-layer heat transfer coefficient is proportional to the 0.8th power of the mass flow rate. Whence, from equation (2), the rate of heat flow through the boundary-layer is given by:

$$dq/dt \simeq K \cdot F^{0.8} \cdot \Delta T \qquad (3)$$

where $K$ is some constant which depends on the physical properties of the heat transporting medium and the dimensions of the conduit, $F$ is the mass flow rate of the heat transporting medium, and $\Delta T$ is the temperature change of the heat transporting medium between the inlet and outlet manifolds. Considering now the rate of heat transfer ($dQ/dt$) from the body of the heat transporting medium between the inlet and outlet manifolds.

$$dQ/dt = C \cdot F \cdot \Delta T \qquad (4)$$

where $C$ is the specific heat of the heat transporting medium, and $F$ and $T$ are as previously defined. Combining equation (3) and (4) gives:

$$\frac{dq}{dt} \simeq \frac{K}{C \cdot F^{0.2}} \cdot \frac{dQ}{dt} \qquad (5)$$

showing that the rate of heat transfer from the heating coil into the heat transporting medium, and hence the rate of electrical power input to the heating coil, is almost proportional to the required heat measurement; the error introduced by the flow dependent term being small. Thus the heat measurement can be obtained as follows:

a. As a rate of heat transfer, in which case the electrical power input to the heating coil is measured by a watt meter which may be calibrated in suitable units (e.g., B.T.U./hr. or Joules/sec). Alternatively, when the heating coil is fed from a constant voltage electrical supply, the electrical power input can be measured by an ammeter connected so as to indicate the mean current by the heating coil; and when the heating coil is fed from a constant current electrical supply, the electrical power input can be measured by a voltmeter connected so as to meter the mean voltage developed across the heating coil.

b. As a time integral of heat transfer, in which case the electrical power input to the heating coil is measured by a watt-hours meter which may be calibrated in suitable units (e.g. B.T.U. or Joules). Alternatively, when the heating coil is of fixed resistance and is fed from a constant voltage or constant current electrical supply, the electrical power input can be measured by a timer connected so as to measure the total on-time of the electrical supply to the heating coil.

It should be understood that whilst the various embodiments of the invention herein described have been adapted to measure the heat lost by the heat transporting medium and have employed electrical heaters situated in the outlet manifold to transfer heat into the flowing medium, the heat so transferred can be supplied from other sources such as hot water or steam. Similarly, the temperature monitoring can be performed by means other than gas thermometers or thermistors (e.g. bi-metal strips) and the controlling device may give a continuously variable or on-off output in a form appropriate to the heat source (e.g. an electrical switch or hydraulic valve). Also, it is possible to reverse the direction of heat transfer and provide for heat withdrawal from the inlet manifold. Furthermore, the invention may be adapted to measure the heat gained by the heat transporting medium between two monitoring points by reversing the roles of the inlet and outlet manifolds in the previously described configurations of the invention.

What we claim is:

1. Heat metering apparatus for measuring heat loss or gain in a confined heat transporting medium flowing in a system having spaced conduits, heat sensitive means for monitoring the temperature of the medium passing through one of said conduits, a thermally conductive section in the other conduit in thermal contact with the medium passing therethrough, means thermally insulating said thermally conductive section from the remainder of said other conduit, means for heating said thermally conductive conduit section, heat sensitive means for monitoring the temperature of said thermally conductive section, and measuring and control means interconnecting said heat sensitive means for detecting measured temperature differences between them and for energizing said heating means for minimizing said differences and measuring the energy so supplied, said heat sensitive means comprising gas filled bulbs associated with the respective conduits and interconnected by a capillary tube containing a switch to form a differential thermometer, and said measuring and control means including a power supply and power input indicator in circuit with said heating means and said switch.

* * * * *